United States Patent
Vaisberg

(10) Patent No.: US 9,573,817 B2
(45) Date of Patent: Feb. 21, 2017

(54) METHOD AND APPARATUS OF MANUFACTURING SILICON SEED RODS

(71) Applicant: Creative Innovations, Inc., Alexandria, VA (US)

(72) Inventor: Vitaliy A. Vaisberg, Westminster, CO (US)

(73) Assignee: Creative Innovations, Inc., Alexandria, VA (US)

( * ) Notice: Subject to any disclaimer, the term of this patent is extended or adjusted under 35 U.S.C. 154(b) by 288 days.

(21) Appl. No.: 14/471,903

(22) Filed: Aug. 28, 2014

(65) Prior Publication Data

US 2014/0366582 A1    Dec. 18, 2014

Related U.S. Application Data

(62) Division of application No. 13/551,295, filed on Jul. 17, 2012, now Pat. No. 8,911,659.

(60) Provisional application No. 61/636,209, filed on Apr. 20, 2012.

(51) Int. Cl.
    *B28B 1/54*    (2006.01)
    *C01B 33/021*  (2006.01)
    *C01B 33/035*  (2006.01)

(52) U.S. Cl.
    CPC ........... *C01B 33/021* (2013.01); *C01B 33/035* (2013.01)

(58) Field of Classification Search
    CPC .................................. B28B 1/54; C01B 33/035
    See application file for complete search history.

(56) References Cited

U.S. PATENT DOCUMENTS

| 4,715,317 A * | 12/1987 | Ishizuka ................. C23C 16/24 |
| | | 118/719 |
| 4,805,556 A * | 2/1989 | Hagan ..................... C23C 16/24 |
| | | 118/715 |
| 7,732,012 B2 | 6/2010 | Hongu et al. |
| 2009/0314207 A1* | 12/2009 | Endoh .................... C01B 33/035 |
| | | 118/723 R |
| 2011/0014468 A1* | 1/2011 | Urushihara ........... C01B 33/035 |
| | | 428/398 |
| 2011/0220283 A1 | 9/2011 | Nagaura et al. |

FOREIGN PATENT DOCUMENTS

| JP | 43008359 Y1 | 4/1968 |
| JP | 63242339 A | 10/1988 |

OTHER PUBLICATIONS

Helmrich et al; "Oxygen in Silicon: A Modern View," *Semiconductor Silicon*, 1977; p. 626-632.

Schwuttke et al.; "Low cost silicon for solar energy conversion applications," *IBM Journal of Research and Development*, 1978; 22(4):335-345.

* cited by examiner

*Primary Examiner* — James Sanders
(74) *Attorney, Agent, or Firm* — King & Spalding LLC

(57) ABSTRACT

A method and apparatus for manufacturing high-purity long silicon seed rods with controlled resistivity for Siemens and similar processes with using a film of silicon dioxide, wherein a film of silicon dioxide is formed on the seed rod in the course of a reaction between a silicon melt and oxygen. The rod is formed with a quartz die and cooled by direct immersion into a cooling fluid, such as de-ionized water and/or by cooling fluid vapor in the gas cooling zone.

10 Claims, 6 Drawing Sheets

METHOD AND APPARATUS OF MANUFACTURING SILICON SEED RODS

CROSS-REFERENCE TO RELATED APPLICATIONS

This application is a divisional of U.S. patent application Ser. No. 13/551,295 filed Jul. 17, 2012, which application claims the benefit of U.S. Provisional Application No. 61/636,209 filed Apr. 20, 2012, which applications are incorporated herein by reference.

BACKGROUND OF THE INVENTION

1. Field of the Invention

This invention relates in general to a method and apparatus for manufacturing of crystalline materials and more particularly to the manufacturing of silicon seed rods for Siemens and similar processes, which are the main methods for manufacturing high-purity polycrystalline silicon and silicon for solar cells.

2. Description of Related Art

In the Siemens process of manufacturing polycrystalline silicon for the semiconductor industry and solar cells, polycrystalline silicon is manufactured by the deposition or growth of silicon on the surface of a solid silicon rod, referred to as a silicon seed rod or core.

As described in U.S. Patent Application Publication No. 2011/0220283 A1 on a disclosure of Akimichi Nagaura et al., the major trends in conventional methods for manufacturing high-purity polycrystalline silicon (SEG-Si) are the Siemens method and the monosilane method, in which a starting-material silane gas is supplied to the interior of a high-temperature reaction furnace, and polycrystalline silicon is manufactured by the deposition or growth of silicon on the surface of a solid silicon rod (silicon seed rod or core). According to this producing method, a plurality of silicon seed rods are provided in a reactor and heated, feed gas is supplied to the reactor and brought into contact with the heated silicon seed rods, and polycrystalline silicon is deposited on the surface of the silicon seed rods by heat decomposition and hydrogen reduction of the feed gas to grow columnar-shaped silicon rods. The silicon seed rods are fixed upright on electrodes that are mounted on a bottom plate portion of the reactor. Every two silicon seed rods are paired and the upper end portions thereof are connected to each other by a short connection rod, so that they form a U-shape.

The silicon seed rods are manufactured by hewing out from a silicon rod. Therefore, since the silicon seed rods are getting shorter after every manufacturing and hewing out cycle, it is necessary to manufacture silicon seed rods from long silicon seed rods periodically. The long silicon seed rod can be produced, for example, by joining short silicon seed rods by welding. See Japanese Unexamined Patent Application, First Publication # S63-242339, and U.S. Patent Application Ser. No. 2011/0220283 A1.

Since the diameter of the silicon rod on which the silicon polycrystals are deposited following the pyrolysis is extremely slender at around 5 mm, the surface area available for deposition in the initial stage of the reaction is so small that this method suffers from the drawback of a slow deposition rate. Furthermore, the resistivity of the silicon rod is high, i.e., 1 kiloohm-cm or higher so that is difficult to pass current through the rod at room temperature. Accordingly, when the reaction is initiated, it is necessary to heat the seed rod from outside by means of a preparatory heating device up to a temperature that enables heating by passage of electrical current. Not only is a high-voltage power supply device required for this heating, but a large amount of electric energy is consumed. This is a factor that increases the cost.

A method using a slender core rod comprising a metal, such as Mo, W, Ta, Nb or the like, with a high recrystallization temperature instead of the Si seed rod used in the Siemens method is also known (U.S. Pat. No. 7,732,012 B2). However, in case of SEG-Si obtained by using a slender core rod comprising metals, such as Mo, W, Ta, Nb or the like, the core part must be removed by some method following completion of the reaction. Moreover, these metals cause diffusion into the silicon that is deposited and grown.

SUMMARY OF THE INVENTION

The present invention is devoted to solve such problems as described above.

Short rods require welding, which results in rod contamination and fluctuations in electrical resistivity values along the rod. The present invention enables manufacturing of rods of virtually unlimited length, reaching 3 meters and more.

Excessive resistivity of rods at room temperature requires expensive rod pre-heating systems or use of slender core rods comprising a metal, such as Mo, W, Ta, Nb or the like, which results in contamination of the polycrystalline silicon deposited on the rod. The present invention enables manufacturing of rods with significantly lower resistivity at room temperature without contaminating rods' material.

The present invention permits the manufacture not only of columnar rods, but rods with flatter cross-sectional shape and greater side surface areas, thus enhancing the efficiency of the Siemens process and similar processes at the initial stage of the reaction without reducing the deposition rate.

Unlike the prior art, the present invention enables, in addition to batch rod manufacturing, semi-continuous or continuous rod manufacturing, and increases the speed and stability of the rod manufacturing process by increasing the effective capillary constant values of the silicon melt and rod growth angle, i.e., the contact angle between the liquid and solid phases in the growing rod $\theta$ (FIG. 2).

Elimination of the need for pre-heating high-resistivity rods and welding rods together, and significantly lower cost of the equipment needed to implement the proposed process, along with the possibility of semi-continuous or continuous rod manufacturing, lower the cost of produced high-purity silicon feedstock and polycrystalline silicon for solar cells.

The invention provides a method of manufacturing high-purity long silicon seed rods for Siemens and similar processes, the method comprising: providing a growth reactor containing a charge, a die having a die hole, an inductor heater providing a silicon melt column above a die, and a silicon seed rod passing through a die hole from below; providing an oxygen-containing atmosphere in the growth reactor; and forming a film of silicon dioxide on the silicon rod. Preferably, the silicon melt is doped with oxygen derived from the oxygen-containing atmosphere and the film of silicon dioxide is formed in the course of the reaction between the silicon melt and oxygen. Preferably, the rod is formed on a seed from the melt in the direction of gravity pull. Preferably, charging is provided by a silicon feed rod lowered onto the die from above, and the melting is produced by induction heating. Preferably, the rod is cooled by direct immersion into a cooling fluid and/or by cooling fluid vapor in the gas cooling zone.

Preferably, the cooling fluid is de-ionized water. Preferably, rods with flatter cross-sectional shape and greater side surface area are produced, their shape is characterized by a gentle increase in rod thickness from the centerline of the rod towards its outer edges, and the relationship between the thickness of the rod at the centerline, its thickness at outer edges, and the width of the rod is defined by a ratio of (1-2.5):5:(10-30). Preferably, the pressure exerted by the melt above the die on the meniscus, the shape and height of the melt column above the die, and the temperature for the growth process are stabilized by a ring placed on the die, and the ring matches the cross-section of the silicon charge, is concentrically aligned with the charge, and is made of a material that can withstand the oxygen-containing atmosphere. Preferably, said ring is made of quartz. Preferably, the height of the ring is between 0.5 and 0.95 of the height of the melt column above the die. Preferably, the silicon rods are bent into a U shape. Preferably, the rods are heated along their full length or along their bending area to 950-1,200° C. Preferably, the rods are heat treated at 300-500° C. for 3-40 minutes to reduce rod resistivity in a controlled manner. Preferably, thickness of the silicon film is from 3 μm to 60-80 μm. Preferably, the thickness of the silicon film is between 25 μm and 60 μm.

The invention also provides a method of manufacturing high-purity long silicon seed rods for Siemens and similar processes, the method comprising: providing a growth reactor containing a silicon charge, a die having a die hole, an inductor heater providing a silicon melt column above a die, and a silicon seed rod passing through a die hole from below; and cooling the silicon columnar rods in a fluid bath. Preferably, the cooling comprises cooling in de-ionized water.

The invention further provides apparatus for manufacturing high-purity long silicon seed rods for Siemens and similar processes, the apparatus comprising: a growth reactor having an oxygen containing atmosphere; a die, having a die hole, die the made of a material that can withstand the oxygen-containing atmosphere; a columnar silicon seed rod in the die hole, the rod having a melt meniscus region; and a silicon charge located above the die in contact with the melt above the die. Preferably, the apparatus further includes a cooling bath located below the die. Preferably, the cooling bath comprises de-ionized water. Preferably, the apparatus further includes a ring located on the die, and the ring having a cross-section matching the cross-section of the silicon charge, the ring being concentrically aligned with the silicon charge, and the ring made of a material that can withstand the oxygen-containing atmosphere. Preferably, the die hole has a die hole radius and the ratio of the meniscus height to the die hole radius is between 0.6 and 2.4. Preferably, the minimum meniscus height is 1 mm. Preferably, said apparatus further comprises an induction heater above the die. Preferably, the apparatus further comprises a plurality of the die holes and a corresponding plurality of the columnar seed rods and wherein the ratio of the distance between the centers of the die-holes to the radius of the die-holes is >4. Preferably, the apparatus further includes a secondary induction heating element having a hole that matches the shape of the silicon rod, and is heated by induction to 900-1,100° C. Preferably, the secondary induction heating element is located beneath the bottom of the die and is concentrically aligned with the die-hole.

The invention not only provides longer rods, but also provides better control of the rod parameters, such as resistivity. Numerous other advantages and features of the invention will become apparent from the following detailed description when read in conjunction with the drawings.

DETAILED DESCRIPTION OF THE PREFERRED EMBODIMENT

Figure 1:
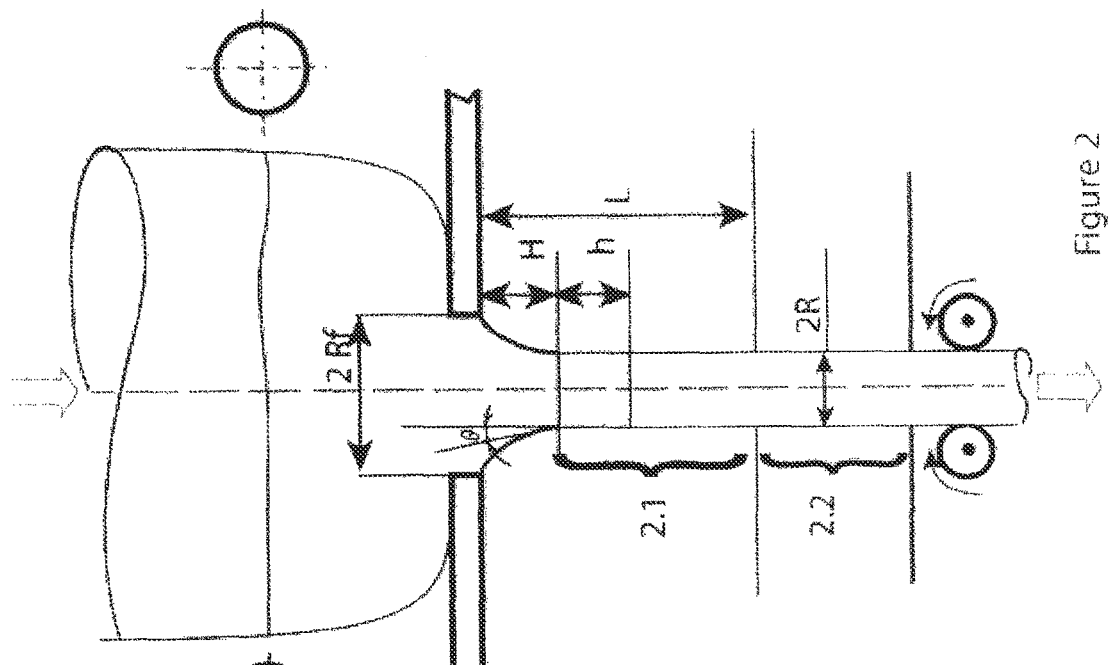
FIG. 1. Rod-growing process diagram, where: 1.1—silicon charge; 1.2—silicon melt, 1.3—induction heater; 1.4—die; 1.5—die hole; 1.6—melt meniscus; 1.7—growth front; 1.8—low border of the "bright" area of the rod; 1.9—rod; 1.10—cooling fluid, such as de-ionized water; 1.11—crystallizer, 1.12—rod pulling mechanism; 1.13 silicon dioxide film.

The melt is doped with oxygen in the reactor with the purpose of reducing rod resistivity, increasing the surface tension of the melt and reducing the rod growth angle. Pure oxygen, or a mixture of oxygen with an inert gas, or a gaseous oxygen-containing compound is delivered to the reactor. When the silicon is melted, a silicon dioxide film 1.13 is immediately formed on the surface of the silicon melt 1.2 (FIG. 1). The silicon dioxide film 1.13 changes the effective capillary constant of the melt and the rod growth angle. The thickness of the film is inversely proportional to the temperature of the melt, and ranges from a few μm to 60-80 μm. Preferably, the thickness is stabilized at the level between 15 and 80 micrometers. The content of optically active oxygen in the rods is $(2.2-3.6) \times 10^{18}$ cm-3.

The molecular oxygen acts as an oxidizer in the so called dry oxidation process ($Si+O_2 \rightarrow SiO_2$). If the growing rod is cooled by direct contact with water, the dry oxidation process is enhanced by the wet oxidation process ($Si+ 2H_2O \rightarrow SiO_2 \rightarrow 2H_2$ (g). However, the dry oxidation process remains dominant in both cases. The thickness of the film 1.13 is inversely proportional to the temperature of the melt and ranges from a few μm to 60-80 μm.

The silicon dioxide film isolates the melt from the surrounding atmosphere. Being a good insulator (with high electrical breakdown strength), the film reduces the probability of electric breakdown between the induction heater and the silicon charge. The film remains stable throughout the entire range of temperatures associated with the rod growing process. It prevents diffusion of boron, phosphorus and arsenic, and protects the rod from contamination. The film is not soluble in water, and, if necessary, may be easily removed by etching without damaging the surface of the rod.

Most importantly, the presence of the high temperature oxide film 1.13 results in a significantly higher capillary constant of the melt and a lower rod growth angle. While the capillary constant of the silicon melt in vacuum is 28.2 mm2, due to the silicon dioxide film it becomes 45 mm2 at the melt temperature of 1,660° C., and reaches 55 mm2 at 1480° C. The surface tension reaches, accordingly, 1.1 J/m3 and 1.4 J/m3. Changes in the duration of the exposure of silicon melt 1.2 to an oxygen-containing atmosphere from 3 to 10 seconds, at ±0.5% experimental accuracy, do not result in changes in capillary constant values, and consequently, in surface tension. We emphasize that the capillary constant must be measured under strictly stationary conditions that generally are reached in the melt only after a long period of time. Yet, its value obtained from experiments provides an accurate characterization of melt meniscus behavior under the actual growth process conditions.

For rods grown under vacuum conditions the growth angle (the contact angle between the liquid and solid phases) is 15° (Low cost silicon for solar energy conversion applications/Schwuttke, G. H., Ciszek T. F., Yang K. H. and others -JBM J. Res., 1978, v.22, #4, p. 335-345). Doping the silicon melt with oxygen and formation of the high temperature silicon dioxide film result in a decrease of growth angle to 4.5-6.5° (at ±1° measurement error). Changes to the properties of the melt caused by doping of the melt with oxygen and formation of the silicon-dioxide film allows for a significantly greater height of the melt meniscus 1.6. This results in greater stability of the growth of the rod 1.9 and higher speed of rod pulling. The silicon dioxide film significantly decreases the wettability of the die 1.4 by the melt 1.2, and allows for direct contact with the cooling fluid, such as de-ionized water, resulting in a significant increase in the efficiency of the crystallizer 1.11, while formation of water vapors (when de-ionized water is used as cooling fluid) increases the heat transfer coefficient for rod cooling in the gaseous environment above the crystallizer 1.11, and, in turn, allows for faster growth of the rod 1.9. (The presence of some 2-11% of suspended water droplets in the gas stream increases the heat transfer coefficient by a factor of 1.5 to 8.)

Figure 2:
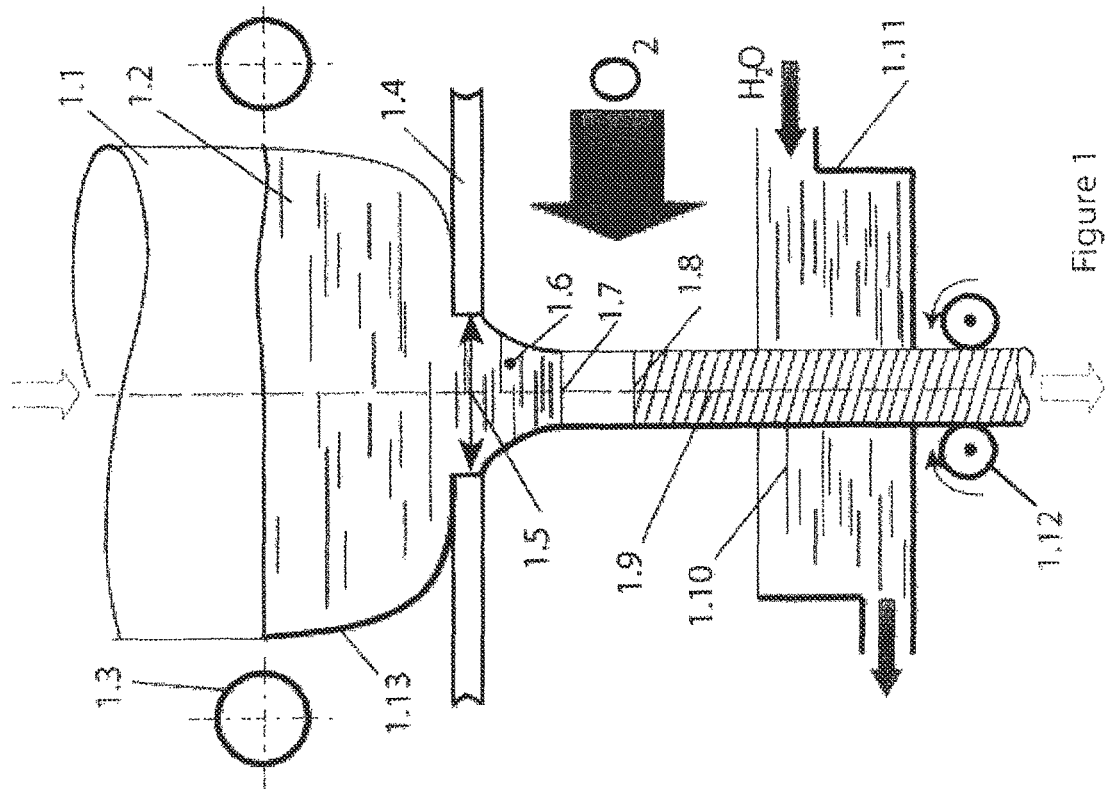
FIG. 2. Rod growth model representation, where: Rf—radius of the die-hole; H—meniscus height; h—"bright" area of the rod height; L—distance between the bottom of the die and the surface of the cooling fluid; R—rod radius; 2.1—portion of the rod cooled by growth reactor atmosphere; 2.2—portion of the rod cooled by cooling fluid.

The rod growth process takes place in the same reactor, simultaneously with the rod doping with oxygen (FIG. 1 and FIG. 2). The die 1.4 consists of quartz plate with a die-hole. The melt above the die 1.2 is produced by melting the end of the charge silicon rod 1.1 using an induction heater 1.3. As the melt is consumed, the charge rod is lowered. The seeding process is supported by a portion of a previously formed rod that is introduced into the die-hole 1.5 from below. The growing rod 1.9 is cooled both by the reactor atmosphere and direct exposure to the cooling fluid 1.10, such as de-ionized water, inside the crystallizer 1.11 that is placed beneath the die 1.4 and concentrically aligned with the growing rod. The crystallizer that can move vertically relative to the die 1.4 has holes on its inward walls, and a bottom (made, for example, of quartz fabric) with a hole, whose diameter equals the diameter of the rod being grown. As the rod grows it exits the process zone, and can be cut below the pulling mechanism 1.12 at any desired length without stopping the process, and the process can be run in a semi-continuous or continuous mode.

The rod growth occurs in the direction of gravity pull. The factors that affect the growth process the most are: the distance between the die and the surface of the cooling fluid L, the heat transfer coefficient in the reactor atmosphere, i.e., the intensity of cooling of the growing rod in the reactor atmosphere, the heat transfer coefficient of fluid cooling, and the temperature of the melt in the die. Rod growth process specifications are preferably as follows: melt temperature −1,480 to 1,750° C., cooling fluid flowrate −25 to 50 liters per hour, oxygen flowrate −0.25 to 0.5 m3/hour, produced rod diameter −4 to 12 mm, growth rate for a single columnar-shape rod −40 to 120 mm/min. The growth reactor is not sealed.

The maximum possible meniscus height HMAX is a recognized criterion of the stability of the rod growth process. Greater HMAX values let us establish and maintain the growth front at a safe distance from extreme critical values. When meniscus height values are small—less than 1 mm in our case—the rod growth occurs in a highly restricted environment that results in surface imperfections, melt sticking ("freezing") to the die, and interruption of the growth process. When the meniscus height is greater than HMAX, the rod is severed from the meniscus, and the growth process stops. Maintaining the required ratio of the maximum permissible meniscus height to the die-hole radius that ranges 0.6 to 2.4, and can be reached by implementing the process described in the claims, allows us to calculate and reliably control the required process parameters for growing rods of a specified diameter at a specified growth rate.

Growing a plurality of rods simultaneously increases the efficiency of rod manufacturing. It reduces the consumption of feedstock, electric power, and supplies. When multiple rods of the same cross-section are being grown simultaneously, they need to be grown at the same temperature environment. The shorter is the distance between the centerlines of die-holes, the greater is the number of rods that can be grown simultaneously. However, this increases the heat-transfer interferences between the rods, results in less favorable conditions for cooling of the rods in the reactor atmosphere, and at tighter spacing, in the cooling fluid as well, and, consequently, reduces the rod growth rates. Moreover, the rods' growth front 1.7 begins to move away from the horizontal reference thus leading to the curvature in rods being grown.

When the ratio of the distance between die-holes to the radius of the die-hole is ≥4, there are no significant variations in the heat transfer coefficient values in the reactor atmosphere and in the cooling fluid in the crystallizer, and 2, 3 and 4 fully identical rods with the same cross-section were grown simultaneously. All the die-holes 1.5 of the crystallizer 1.11 were arranged in a straight line.

Figure 3:
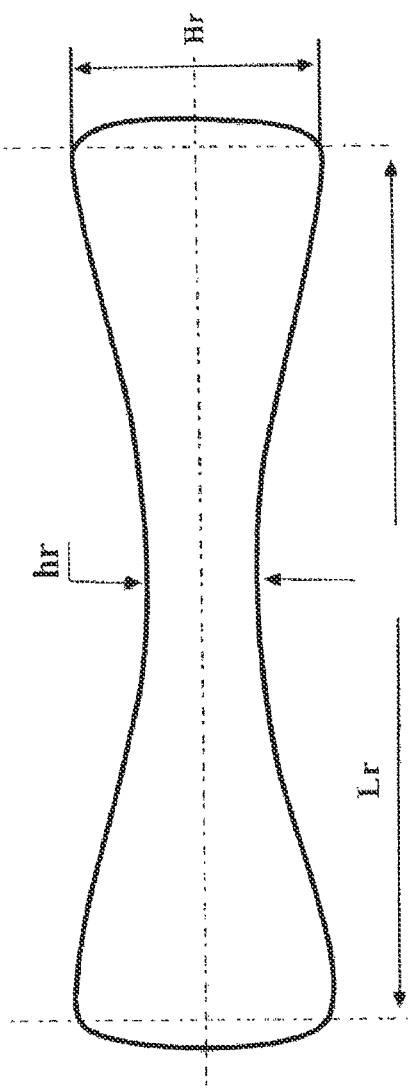
FIG. 3. Optimal cross-section of the rod with flatter cross-sectional shape and greater side surface areas, where: HR—thickness of the rod at outer edges, hR—thickness of the rod at the centerline, LR—length along the cross-section of the rod.

In addition to columnar rods, the present invention enables manufacturing of rods with flatter cross-sectional shape and greater side surface area, thus increasing the efficiency of the Siemens process and other similar processes at the initial stage of the reaction without decreasing the deposition rate. The Japanese patent 43-8359, published on Mar. 30, 1968, proposes to use rods with rectangular cross-section. When such rods are heated by electric current, the middle part of the rod is heated more than its narrow faces and the adjacent portions of wide faces of the rod. This restricts the potential benefits resulting from the larger deposition area. Several flatter rods of various cross-sectional shapes with greater surface areas grown using the method and apparatus proposed herein were tested. The rods with dumbbell-shaped cross-section are mechanically stronger than rods with rectangular cross-section. The thicker cylindrical bosses along the outer edges of the rod help equalize the heating temperature and, accordingly, the rate of silicon deposition across the surface of the rod. The plasma preheating brings such rods to the required temperature. However, such rods are poorly suited for high-voltage preheating that is a better option in terms of ensuring the purity of the material. During preheating, the cylindrical bosses of the rod are heated more than the middle part of the rod, and sharp changes in thickness near the edge of the rod impede heat transfer between the cylindrical bosses and the flatter middle part of the rod. Moreover, the external heat dissipation from the middle part of the rod is greater than from the outer cylindrical bosses. In some cases, the high temperature gradient along the cross-section of the rod leads to mechanical failures of the rod. It has been determined that from the standpoint of ensuring the highest degree of compatibility with high-voltage pre-heating, high mechanical strength, and uniform heating throughout the rod, it is best to use rods with a gentle increase in rod thickness from the centerline to outer edges (FIG. 3). The ratio describing the relationship of the thickness at the centerline of the rod hR, thickness at outer edges HR, and the width of the rod LR is (1-2.5):5:(10-30). When the hR to HR ratio is greater than 0.5 the cross-section of the rod approximates a rectangle, and the middle part of the rod heats up faster than its outer edges. When the hR to HR ratio is less than 0.2, the high temperature gradient along the cross-section of the rod during the high-voltage preheating can result in mechanical failures of the rod. When the hR to LR ratio is less than 10, the gain in the side surface area relative to columnar rods is small. When the hR to LR ratio is greater than 30, the cross-section of the rod also approximates a rectangle.

Figure 4:
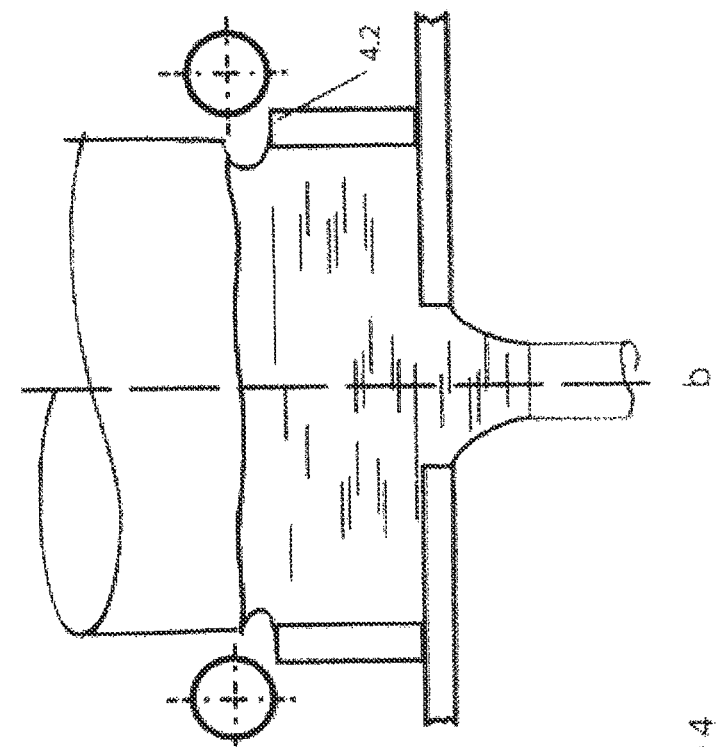
FIGS. 4a and 4b. Stabilizing ring that matches the cross-section of the silicon charge, is concentrically aligned with the charge and is made of a material that can withstand the oxygen-containing atmosphere, where: 4.1—possible side shape of the melt without the stabilizing ring, 4.2—stabilizing ring.
Figure 4:
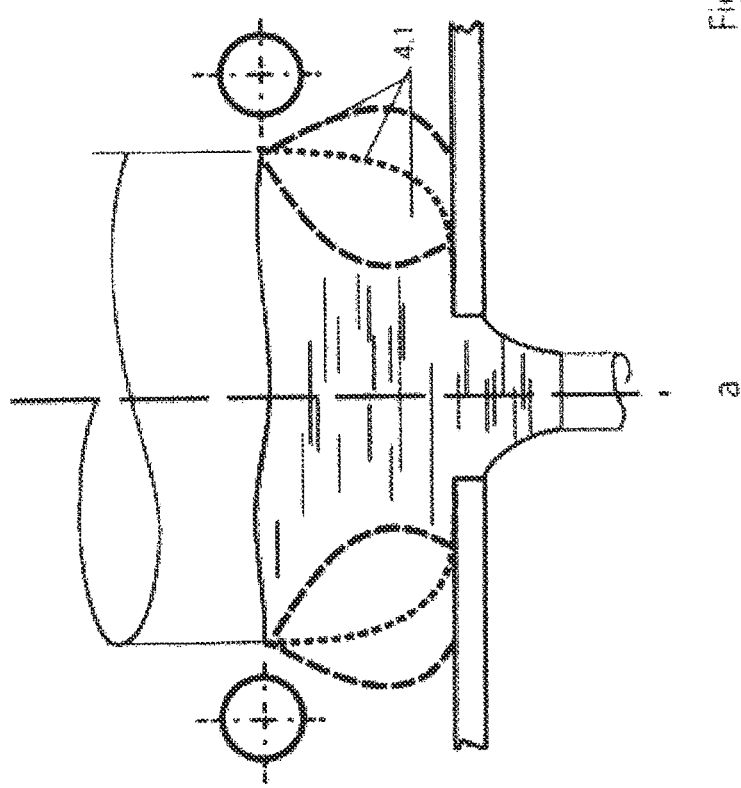
Figure 5:
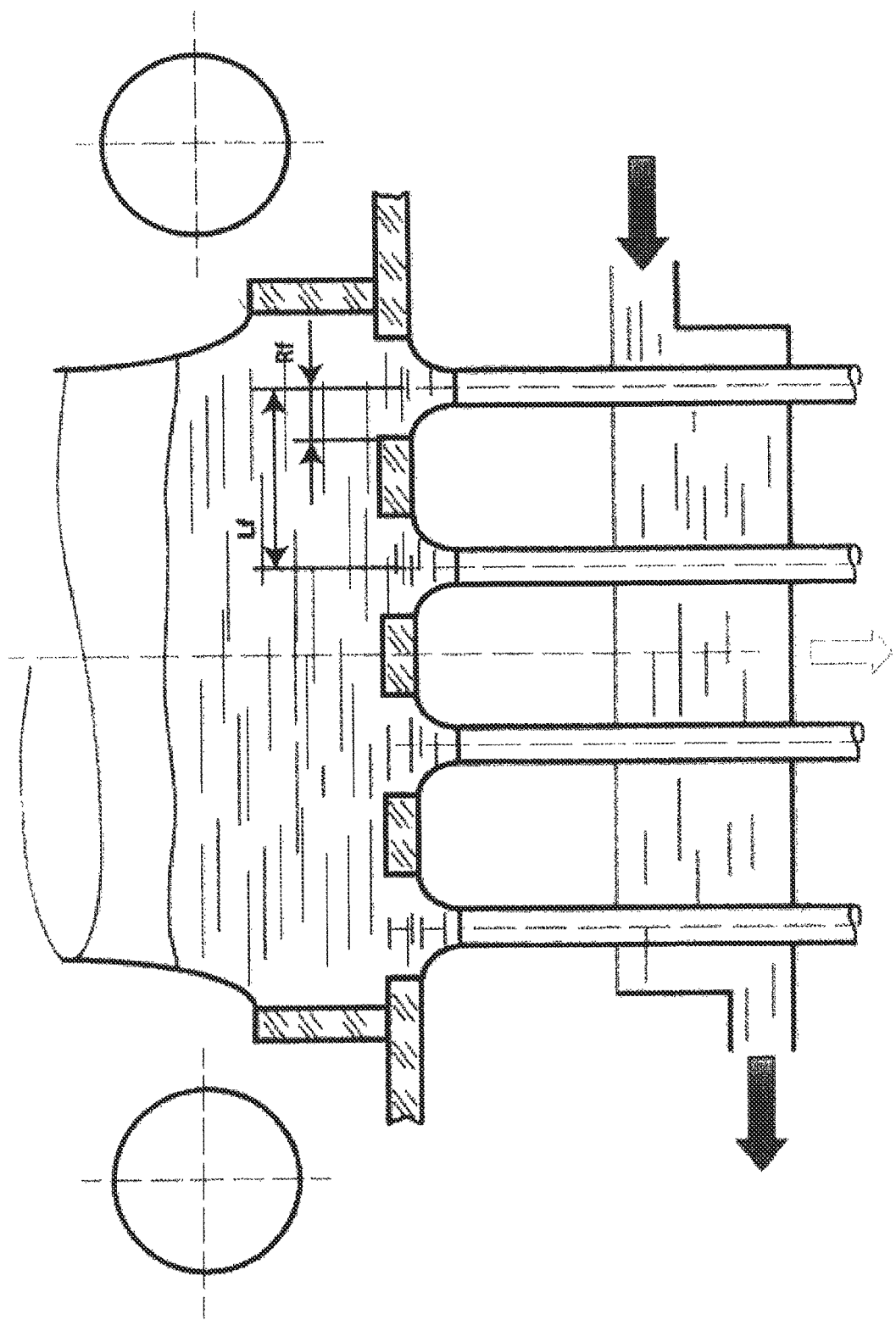
FIG. 5. Growing a group of columnar rods, where: LF—distance between die-holes, RF—die-hole radius.

The pressure of the melt applied to the meniscus is a significant factor affecting the growth process that comprises three pressure components: static pressure, flowing pressure and Laplace pressure. The latter is caused by the lateral squeeze on the melt column resulting from surface tension. This pressure component may vary spontaneously due to changes in the geometry of the side surfaces of the melt column above the die (FIG. 4). At the same time, the combined pressure applied to the melt meniscus is subject to uncontrolled variations. Changes in geometry of the side surfaces of the melt column above the die at constant height of the melt column lead to changes in melt volume, and, subsequently, to temperature fluctuations.

A ring that matches the cross-section of the charge, is concentrically aligned with the charge, is made of a material that can withstand an oxygen-containing atmosphere, such as quartz, and has a height of 0.5 to 0.95 of the specified height of the melt column above the die is used to stabilize the shape and volume of the melt column above the die. The silicon melt has to fill up the inner volume of the ring. The ring also shields the inductor from the melt. When the height of the ring is less than 0.5 of the specified height of the melt column above the die, the required degree of stabilization of Laplace pressure on the meniscus cannot be achieved. When the height of the ring is greater than 0.95 of the height of the melt column, there is a greater risk of melt sticking ("freezing") at the upper edge of the ring.

The rod cooling occurs in two zones, i.e., in the gas cooling zone in the reactor and in the fluid cooling zone. The gas cooling zone is further divided into the "bright zone", where the rod temperature decreases from 1,412° C. to 650±30° C., and "dark zone", where the temperature decreases from 650±30° C. to approximately 200° C. Most stress occurs in the rod during its cooling in the "bright zone" zone. To extend this zone and decrease the temperature gradient along the rod below the growth front, where most stress is induced, a secondary stainless steel induction heating element is used that has a hole matching the geometry of the rod being grown and is heated to 900-1,100° C. by induction currents. The secondary heating element is installed below the bottom of the die and is concentrically aligned with the die-hole. The upper edge of the secondary heating element is located slightly below the growth front to permit the observation of the latter. The ultimate bending and compression strength of rods so grown has increased significantly, and for rods with a gentle increase in thickness from the centerline towards outer edges grown at the rate of 30 mm/minute has exceeded 350 MPa and 270 MPa, respectively.

Figure 7:
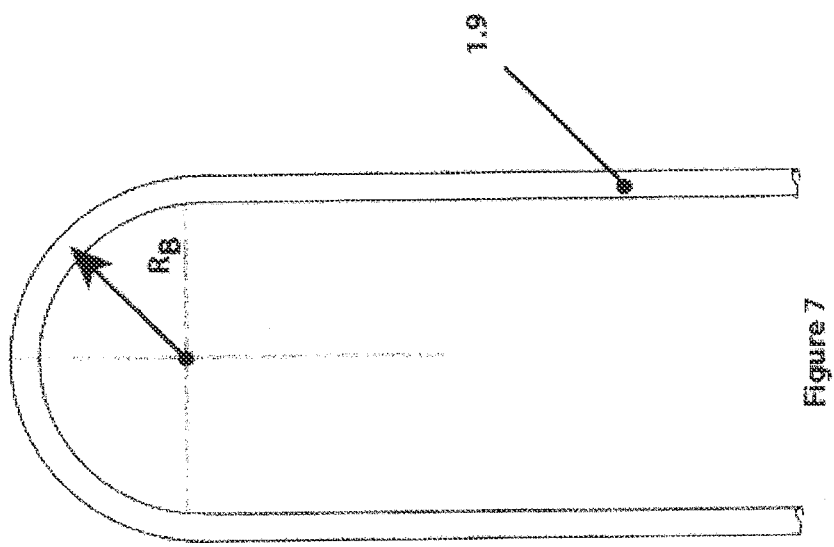
FIG. 7 shows the seamless U-shaped rod ready for installation into a Siemens or other similar process chamber, where RB is the U-shape bending radius for the long rod. 2RB is the required spacing between the rods in a Siemens or other similar process chamber.

Method and apparatus according to the claims allow for manufacturing of rods of any desired length and for replacing welding in manufacturing of U-shaped rods by bending that is associated with a lower level of contamination. The optimal temperature range for bending the long rods and manufacturing U-shaped rods is 950° C. to 1,200° C. The area of the long rod to be bent is made suitable for plastic bending by heating said area or the entire rod to 900° C. to 1,200° C., and bent into a U-shape on a template of the required diameter RB (FIG. 7). The value of RB is selected based on the spacing between the rods required for installation into a Siemens process apparatus. The value of 2 RB equals the required spacing between the rods. The rod can be heated to a plastic state by applying electrical current to the rod or by using any other method that does not contaminate the surface of the rod.

Figure 6:
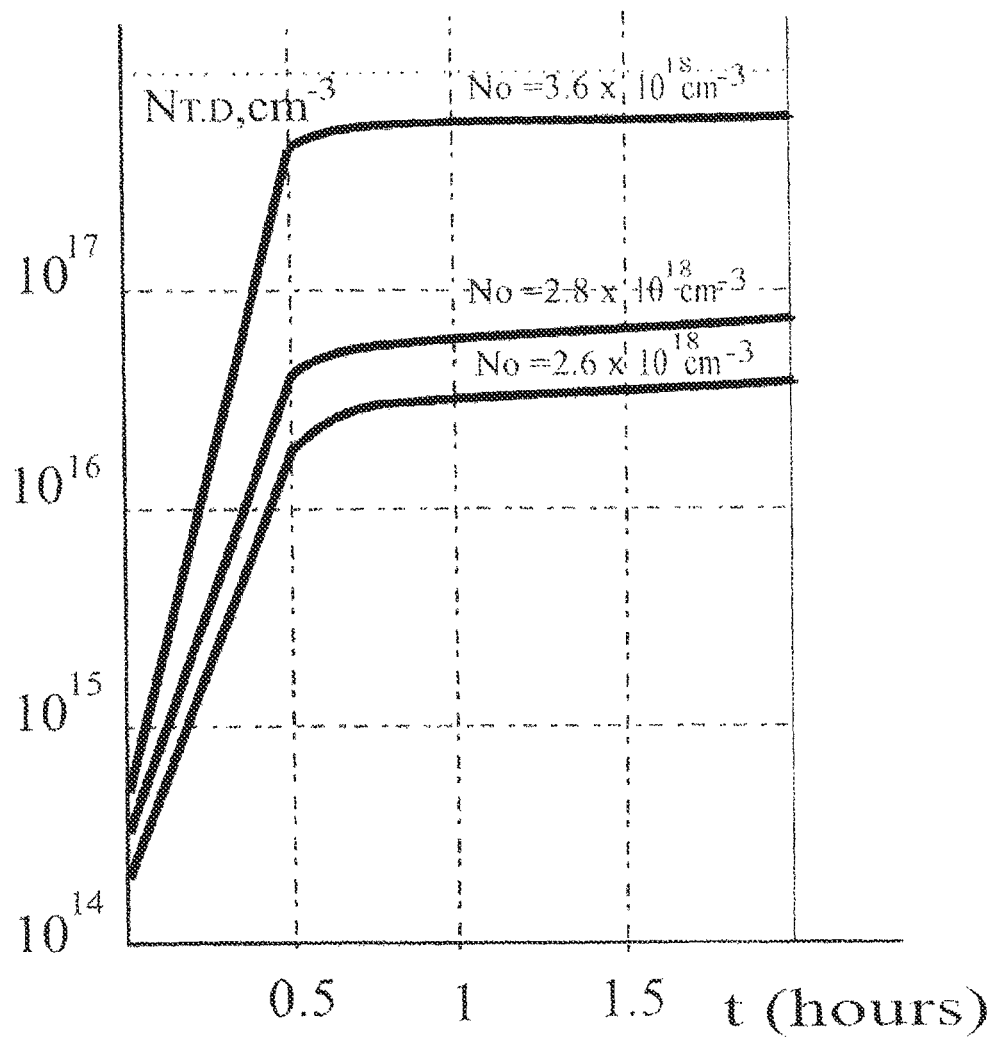
FIG. 6. Thermal donors' concentration vs. time of rod's heat treatment at 430° C. for various oxygen concentrations in the rod subject to heat-treatment, where: NO—oxygen concentration in the rod immediately following the growth process, NTD—thermal donors' concentration, t—heat-treatment time.

The oxygen dissolved in the silicon crystal lattice does not affect the electrical conductivity of silicon. However, when the oxygen-containing rods are subject to heat-treatment at certain temperatures, oxygen-silicon compounds are formed, some of which are electrically active (Helmreich D. Stirtl, "E. Oxygen in silicon: a modern view," *Semiconductor Silicon,* 1977, p. 625-635). Three temperature ranges are known to generate electrically active centers, i.e., 350-500° C., 600-800° C., and 900-1000° C. The intensity of generation of electrically active centers in the 350-500° C. range is significantly higher than in the other two ranges. Variations in the duration of heat treatment at 350-500° C. ranging 3 to 40 minutes let us reduce the resistivity of the rod in a controlled manner. Increasing the duration of heat treatment to more than 40 minutes is not recommended, since the concentration of heat-induced thermal donors reaches the saturation level at approximately 40 minutes (FIG. 6).

There has been described a novel method and apparatus for forming silicon seed rods, that is able to form much longer rods with controlled parameters. At the same time, it is able to form such rods more efficiently. It should be understood that the specific formulations and methods described herein are exemplary and should not be construed to limit the invention, which will be described in the claims below. Further, it is evident that those skilled in the art may now make numerous uses and modifications of the specific embodiments described without departing from the inventive concepts. Any of the parts of any one of the embodiments may be combined with any of the parts of any of the other embodiments. Equivalent structures and processes may be substituted for the various structures and processes described; the subprocesses of the inventive method may, in some instances, be performed in a different order; or a variety of different materials and elements may be used. Consequently, the invention is to be construed as embracing each and every novel feature and novel combination of features present in and/or possessed by the silicon seed rod apparatus and method described.

I claim:

1. An apparatus for manufacturing high-purity long silicon seed rods for Siemens and similar processes, said apparatus comprising:
   a growth reactor having an oxygen-containing atmosphere;
   a die, having a die hole, said die made of a material that can withstand said oxygen-containing atmosphere;
   a columnar silicon seed rod passing through said die hole from below, said rod having a melt meniscus region;
   a silicon charge located above said die in contact with said seed rod melt meniscus area; and
   an induction heater located above said die providing a silicon melt column above said die.

2. An apparatus as in claim 1, and further including a cooling bath located below said die.

3. An apparatus as in claim 2 wherein said cooling bath comprises de-ionized water.

4. An apparatus as in claim 1, and further including a ring located on said die, and said ring having a cross-section matching the cross-section of the silicon charge, said ring being concentrically aligned with said silicon charge, and said ring made of a material that can withstand the oxygen-containing atmosphere.

5. An apparatus as in claim 4 wherein said ring's height is between 0.5 and 0.95 of the specified height of the melt column above said die.

6. An apparatus as in claim 1 wherein said die hole has a die hole radius and the ratio of the meniscus height to the die hole radius is between 0.6 and 2.4.

7. An apparatus as in claim 6 wherein the minimum meniscus height is 1 mm.

8. An apparatus as in claim 1, and further comprising a plurality of said die holes and a corresponding plurality of said columnar seed rods, and wherein the ratio of the distance between die hole centers to the radius of the die-holes is >4.

9. An apparatus as in claim 1, and further including a secondary induction heating element having a hole that matches the shape of said silicon rod, and is heated by induction to 900-1,100° C.

10. An apparatus as in claim 9 wherein said secondary induction heating element is located beneath the bottom of the die and is concentrically aligned with said die hole.

* * * * *